US012366051B2

(12) United States Patent
Gaikwad et al.

(10) Patent No.: US 12,366,051 B2
(45) Date of Patent: Jul. 22, 2025

(54) CONTROL METHOD FOR A MANUALLY ACTUATED LEVER PROVIDED FOR ACTUATING AN OPERATING AND/OR WORK FUNCTION

(71) Applicant: DEERE & COMPANY, Moline, IL (US)

(72) Inventors: Kamlesh Gaikwad, Saswad (IN); Christoph Wagner, Reilingen (DE); Sebastian Jung, Heddesheim (DE)

(73) Assignee: DEERE & COMPANY, Moline, IL (US)

( * ) Notice: Subject to any disclaimer, the term of this patent is extended or adjusted under 35 U.S.C. 154(b) by 231 days.

(21) Appl. No.: 18/250,343

(22) PCT Filed: Oct. 19, 2021

(86) PCT No.: PCT/EP2021/078958
§ 371 (c)(1),
(2) Date: Apr. 24, 2023

(87) PCT Pub. No.: WO2022/089998
PCT Pub. Date: May 5, 2022

(65) Prior Publication Data

US 2023/0399815 A1 Dec. 14, 2023

(30) Foreign Application Priority Data

Oct. 28, 2020 (DE) ......................... 102020128321.0

(51) Int. Cl.
*E02F 9/20* (2006.01)
*G05G 9/047* (2006.01)

(52) U.S. Cl.
CPC ........... *E02F 9/2012* (2013.01); *G05G 9/047* (2013.01); *G05G 2009/04774* (2013.01)

(58) Field of Classification Search
CPC .................. E02F 9/2012; G05G 9/047; G05G 2009/04774
See application file for complete search history.

(56) References Cited

U.S. PATENT DOCUMENTS

| | | | |
|---|---|---|---|
| 6,948,398 | B2 | 9/2005 | Dybro |
| 10,088,915 | B2 | 10/2018 | Drum |

(Continued)

FOREIGN PATENT DOCUMENTS

| | | | |
|---|---|---|---|
| DE | 102014214989 A1 | 2/2016 | |
| EP | 0981078 A2 | 2/2000 | |

OTHER PUBLICATIONS

International Search Report in application No. PCT/EP2021/078958, dated May 5, 2022, 8 pages.

*Primary Examiner* — Henry Tsai
*Assistant Examiner* — Aurangzeb Hassan

(57) ABSTRACT

In a control method for actuating a manually actuated lever provided for actuating an operation and/or work function, the manually actuated lever includes a device for hand detection, which releases an actuation of the operation and/or work function when a sensor-based evaluation of the positioning of a palm resting on a handle piece of the manually actuated lever surmises an activating intent on the part of an operator. In the event that the manually actuated lever is deflected from a neutral or rest position, an operating command corresponding to the current deflection state is generated, wherein a control command intended to execute the operation and/or work function is matched, according to a predefined transition function and via a control unit, to the operating command resulting from the deflection state, as soon as the actuation of the operation and/or work function is released by the device for hand detection.

12 Claims, 2 Drawing Sheets

(56) References Cited

U.S. PATENT DOCUMENTS

| | | | | |
|---|---|---|---|---|
| 2008/0311993 | A1 | 12/2008 | Beutler et al. | |
| 2009/0195659 | A1 * | 8/2009 | Nagata | G06F 3/03547 345/173 |
| 2009/0222167 | A1 * | 9/2009 | Goodwin | B62D 6/00 701/1 |
| 2015/0025746 | A1 * | 1/2015 | Yoshizawa | F02N 11/0822 701/41 |
| 2018/0004310 | A1 * | 1/2018 | Drum | G06F 3/0354 |

* cited by examiner

CONTROL METHOD FOR A MANUALLY ACTUATED LEVER PROVIDED FOR ACTUATING AN OPERATING AND/OR WORK FUNCTION

CROSS-REFERENCE TO RELATED APPLICATIONS

This application is a National Stage of PCT Application No. PCT/EP2021/078958, filed Oct. 19, 2021, which claims the benefit of and priority to German Patent Application No. 102020128321.0, filed Oct. 28, 2020, which are hereby incorporated by reference.

FIELD OF THE DISCLOSURE

The disclosure relates to a control method for a manually actuated lever provided for actuating an operating and/or work function.

BACKGROUND

A manually actuated lever in the form of a joystick is known, for example, from DE 10 2014 214 989 A1, wherein it has a hand part for manually activating the joystick and a sensor matrix, covering the hand part in a handle region, with a plurality of touch-detecting sensor elements.

SUMMARY

An evaluation unit generates a hand-presence signal which is indicative of an activating intention of a user when it detects, based on sensor signals supplied by the touch-detecting sensor elements, that the handle region is touched by the palm or the fingers in a manner which is characteristic for the existence of an actuating intention. In order to prevent a reaction, which is unexpected for the user, from units provided to perform the operating and/or work function, their actuation is then usually enabled when, or only when, the manually actuated lever is situated at the same time in its neutral or rest position. If the user has already deflected the manually actuated lever, the latter needs to first be restored to the neutral or rest position. This is inconvenient and results in a corresponding loss of user comfort.

In view of this, the object of the present disclosure is to improve a control method of the type mentioned at the beginning with regard to its user comfort.

This object is achieved by a control method for a manually actuated lever for actuating an operating and/or work function having the features of one or more of the following embodiments.

In the control method for a manually actuated lever provided for actuating an operating and/or work function, the manually actuated lever comprises a device for hand detection which enables actuation of the operating and/or work function when, or only if, a sensor-based evaluation of the positioning of a palm resting on a handle part of the manually actuated lever indicates the existence of an activating intention on the part of a user. In the case of the manually actuated lever being deflected from a neutral or rest position, an actuation command corresponding to the current deflection state is generated, wherein a control command, provided to perform the operating and/or work function, is aligned by a control unit, according to a predefined transfer function, with the actuation command resulting from the deflection state as soon as the actuation of the operating and/or work function is enabled by the device for hand detection.

There is thus a functional distinction between the actuation command, on the one hand, which reproduces the desire of the user represented by the respective deflection state of the manually actuated lever, and the control command, on the other hand, on which is based the actual activation of the units provided for performing the operating and/or work function. In principle, the alignment between the control command and the actuation command can be made by the control unit between analog or digital values.

By virtue of a corresponding choice of the transfer function, which can have the progression of a ramp which, starting from a starting value corresponding to the neutral or rest position of the manually actuated lever, approaches the current value of the actuation command and is thus aligned with it, it is possible, with responses of the device for hand detection, to shift the operating and/or work function successively into the state desired by the user without there being any need for further measures or actions on their part. There is a significant gain in user comfort as a result.

Moreover, the successive and thus relatively slow alignment procedure allows the user to interrupt the recording of the operating and/or work function at an early point in time by letting go of the manually actuated lever or moving it to a neutral position.

The manually actuated lever can be a conventional joystick, wherein the function implemented according to the method can be provided for each of the actuating degrees of freedom of the joystick or alternatively only for selected activation and deflection directions. In this respect, free configurability on the part of the user is also possible, inter alia depending on the respective operating and/or work function to be performed. The manually actuated lever, accommodated in a driver's cab of the agricultural tractor, typically serves to actuate operating and/or work functions which are connected with a front loader situated on the agricultural tractor, a three-point hitch, an accessory attached to the three-point hitch, or a driving function of the agricultural tractor itself.

Advantageous embodiments of the control method according to the disclosure can be found herein.

For example, the control command is performed by the control unit when, or only when, the enabling by the device for hand detection takes place within a predefined connection time after leaving the neutral or rest position. This largely ensures that there is a causal link between the activation of the manually actuated lever (by deflection from the neutral or rest position) and the actual intention to actuate the associated operating and/or work function. For this purpose, the connection time is generally predefined within a range from 0.5 to 1.0 seconds, wherein, however, depending on the operating and/or work function to be actuated, any other value can also be expedient.

It is also conceivable that the performing of the control command starts with a delay according to a predefined latency. The latency serves for the defined resetting of the control command to a starting value corresponding to the neutral or rest position of the manually actuated lever. For this purpose, the latency is typically of an order of magnitude of one individual cycle of the generally microprocessor-controlled control unit.

It is moreover possible that, when a singular full deflection of the manually actuated lever, detected after enabling the actuation of the operating and/or work function, is detected, the running of the transfer function is modified by the control unit such that the control command is set directly to a value corresponding to the full deflection. The occurrence of such a full deflection signals to the control unit that a specific functional state, for example one saved by the user, is to be called up for the relevant operating and/or work function.

In the case of a work function relating to a front loader on an agricultural tractor, the saved functional state can be, for example, a predefined position of a front loader swing arm which can be raised and lowered hydraulically or of a loading tool which can be tilted hydraulically. The latter has, for example, the form of a scoop or a loading fork. This functional state is maintained until the user returns the manually actuated lever to the neutral or rest position and deflects it again therefrom.

The hydraulic control valves (SCVs) which are usual on agricultural tractors can be mentioned as a further example. These serve to connect hydraulic units which are part of the accessories which can be attached to the agricultural tractor. The control valves can be placed in an unpressurized floating position in which a free hydraulic flow is possible for specific operating and/or work functions. The saved functional state can accordingly be formed by a floating position comprised by the control valve.

The manually actuated lever often also serves operating functions such as controlling the driving speed or driving direction of the agricultural tractor, wherein the saved functional state in such a case can correspond to a predefinable driving speed or driving direction.

For the sake of completeness, it should be noted that the abovementioned operating and/or work functions are of a purely exemplary type and that a plurality of other applications in commercial vehicles from the agricultural, forestry, or construction sector are also additionally conceivable.

Alternatively, when a singular full deflection of the manually actuated lever, detected before enabling the actuation of the operating and/or work function, is detected, the control command can, by modifying the transfer function, be set directly to a value corresponding to the full deflection. This situation differs from that described above in that the user can indicate their clear intention, already before the point in time at which the device for hand detection responds, to call up the functional state, associated with the full deflection of the manually actuated lever, for the relevant operating and/or work function.

In contrast, should a plurality of singular full deflections occur at the manually actuated lever, one after the other, this is assumed to be an error on the part of the user and modification of the transfer function is stopped.

It is furthermore possible that, when a full deflection of the manually actuated lever, present when the actuation of the operating and/or work function is enabled, is detected, the control command is, by modifying the transfer function, set directly to a value corresponding to the full deflection. This represents a variation on the preceding case in that the user activates the manually actuated lever already at the point in time that the device for hand detection responds with the clear intention of calling up the functional state saved for the relevant operating and/or work function.

BRIEF DESCRIPTION OF THE DRAWINGS

The control method according to the disclosure for a manually actuated lever provided to actuate an operating and/or work function is illustrated below with the aid of the attached drawings, in which.

DETAILED DESCRIPTION

Figure 1:
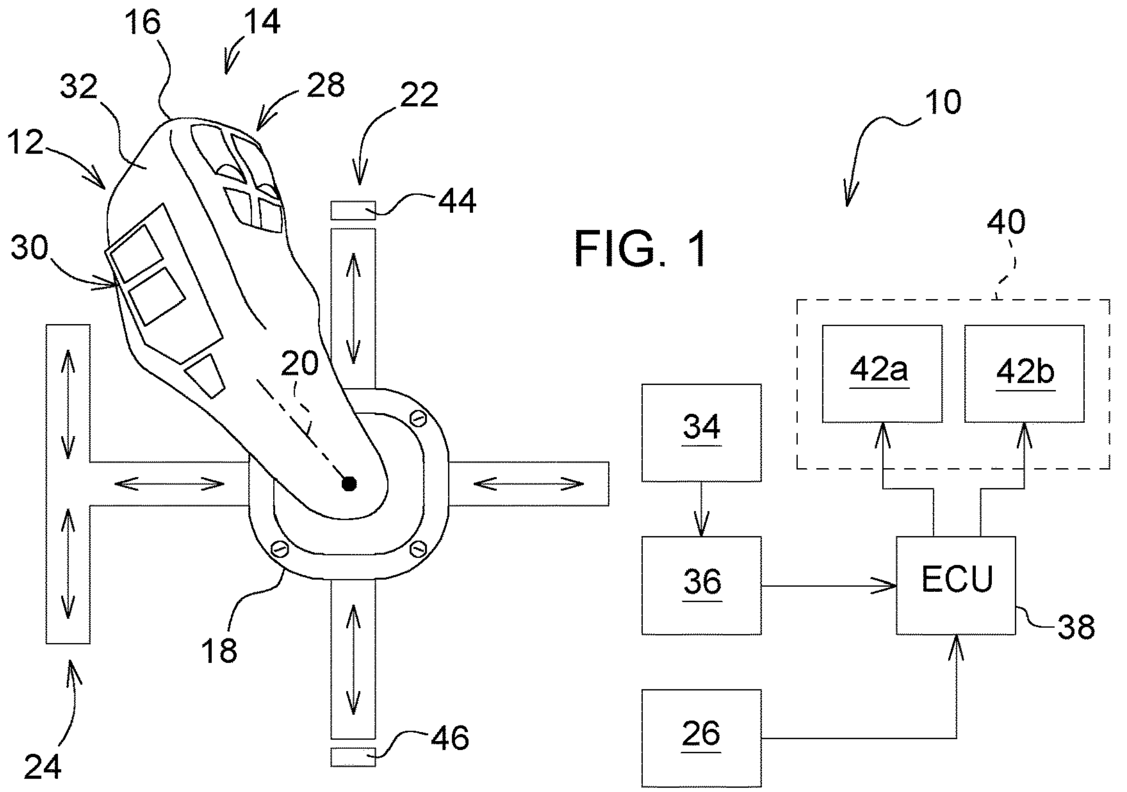
FIG. 1 shows an arrangement operated by the control method according to the disclosure, with a manually actuated lever, designed as a joystick, for an agricultural tractor.

FIG. 1 shows an arrangement operated by the control method according to the disclosure for an agricultural tractor (not illustrated).

The arrangement 10 comprises a manually actuated lever 14 designed as a joystick 12. The manually actuated lever 14 has a handle part 16 and a fastening base 18 within which the handle part 16 can be deflected from a neutral or rest position 20 along different activation slots 22, 24 such that an associated operating and/or work function can be actuated manually. An activation sensor 26 serves to detect the respective deflection state of the handle part 16 and to generate deflection signals corresponding thereto.

In addition to a plurality of actuating elements 28, 30, the handle part 16 comprises a sensor array 34, embedded in a handle surface 32, which is part of a device for hand detection 36. When the device for hand detection 36 indicates, by evaluation of the positioning, recorded by the sensor array 34, of a palm resting on the handle part 16, the existence of an activating intention of a user, it generates a hand presence signal enabling the actuation of the operating and/or work function.

The hand presence signal is supplied, together with the deflection signals, to a microprocessor-controlled control unit 38 (e.g., a controller including a processor and memory) for further processing.

Different operating and/or work functions can be assigned to the manually actuated lever 14 depending on the intended use. They can relate to the agricultural tractor itself or alternatively to a front loader situated on the agricultural tractor, to a three-point hitch, to an accessory attached to the three-point hitch, and the like. In the present case, the manually actuated lever 14 serves to control a driving function of the agricultural tractor, to be more precise a driving speed or driving direction. The driving speed or driving direction is here adapted at the instigation of the control unit 38 by corresponding engagements in a drive train 40 and therefore in an engine and/or gearbox control system 42*a*, 42*b* of the agricultural tractor. The adaptation here takes place according to the deflection signals supplied by the activation sensor 26.

The manually actuated lever 14 can be moved along a primary activation slot 22 in both deflection directions, overcoming a tactile detent, into an upper fully deflected position 44 or lower fully deflected position 46. The primary activation slot 22 serves to specify the driving speed, for which purpose the movement of the agricultural tractor can be accelerated by deflecting the manually actuated lever 14 upward from the neutral or rest position 20 and slowed down by deflecting it downward. A specific functional state of the drive train 40, saved for example by the user, is here associated with the fully deflected position 44, 46 of the manually actuated lever 14. According to the example, specifying the driving speed takes the form of a maximum speed which can be specified by the user, or an "active" standstill of the agricultural tractor in which it is held in its current position with the brake unactivated.

Choosing a driving direction as well as fine adjustment of the driving speed in the manner of a "speed zoom" are possible in a secondary activation slot 24 of the manually actuated lever 14.

The functioning of the control method will now be explained with the aid of the first graph illustrated in FIG. 2.

Figure 2:
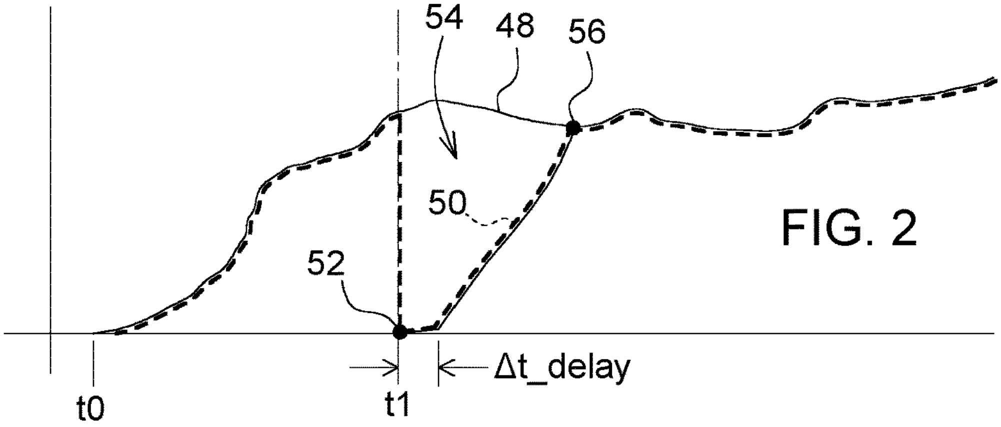
FIG. 2 shows a first graph illustrating the functioning of the control method according to the disclosure.

With respect to the curves illustrated in FIG. 2, there is a functional distinction between an actuation command 48, on the one hand, which reproduces the desire of the user represented by the respective deflection state of the manually actuated lever 14, and a control command 50, on the other hand, on which is based the actual activation of the units provided for performing the operating and/or work function, here the engine and/or gearbox control system 42*a*, 42*b* of the agricultural tractor, according to the deflection signals communicated to the control unit 38.

According to the example, the user deflects the manually actuated lever 14 at the point in time t0, starting from the neutral or rest position 20, upward along the primary activation slot 22. A value, corresponding to the deflection state, for the actuation command 48 is generated here by the control unit 38 depending on the deflection signals supplied by the activation sensor 26. Because the enabling by the device for hand detection 36 has not yet been executed, the actuation command 48 is, however, initially not converted by the control unit 38 into corresponding engagements in the engine and/or gearbox control system 42*a*, 42*b*. To be more precise, although the value of the control command 50 in FIG. 2 follows that of the actuation command 48, it remains inactive until the device for hand detection 36 responds.

If the device for hand detection 36 detects the existence of an activating intention on the part of the user, which in the present case is the case at the point in time t1, the control command 50 is reset by the control unit 38 initially to a starting value 52 corresponding to the neutral or rest position 20 of the manually actuated lever 14. The performance of the control command 50 here starts with a delay in accordance with a predefined latency Δt_delay. For this purpose, the latency Δt_delay is typically of an order of magnitude of one individual cycle of the control unit 38.

The control command 50 is additionally performed by the control unit 38 when, or only when, the enabling of the device for hand detection 36 takes place within a predefined connection time Δt_enable after leaving the neutral or rest position 20. This largely ensures that there is a causal link between the activation of the manually actuated lever 14 (by deflection from the neutral or rest position 20) and the actual intention to change the driving speed or driving direction. For this purpose, the connection time Δt_enable is specified within the range from 0.5 to 1.0 seconds.

If this condition is met, the control command 50 is aligned with the actuation command 48 by the control unit 38 according to a predefined transfer function 54.

By virtue of a corresponding choice of the transfer function 54, which by way of example in FIG. 2 has the progression of a ramp which, starting from the starting value 52 corresponding to the neutral or rest position 20 of the manually actuated lever 14, approaches the current value 56 of the actuation command 48 and is thus aligned with it, it is possible, with responses of the device for hand detection 36, to shift the driving function successively into the state desired by the user without there being any need for further measures or actions on their part. There is a significant gain in user comfort as a result.

Figure 3:
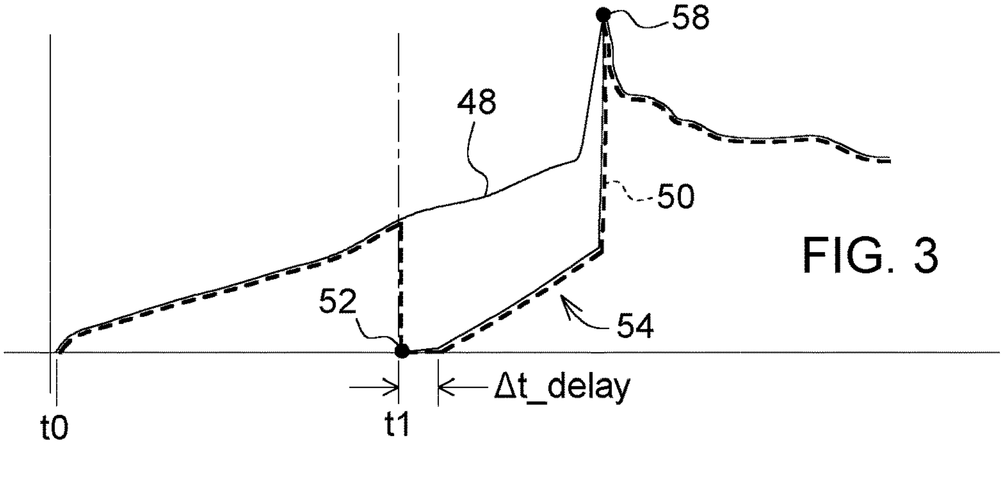
FIG. 3 shows a second graph in which a first special function of the control method according to the disclosure is reproduced.
Figure 4:
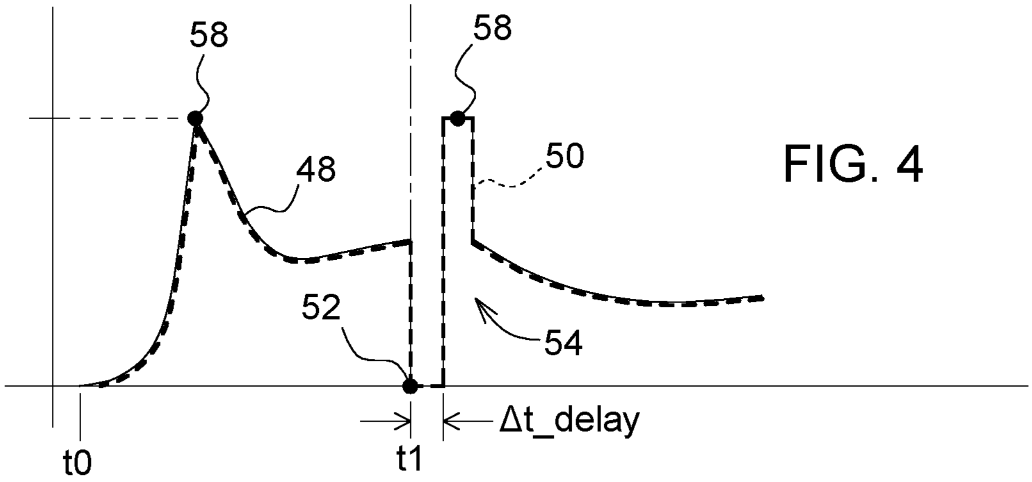
FIG. 4 shows a third graph in which a second special function of the control method according to the disclosure is reproduced.
Figure 5:
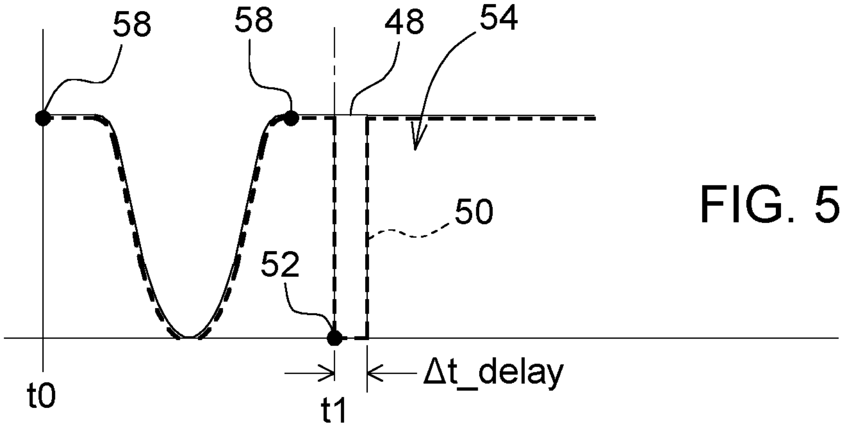
FIG. 5 shows a fourth graph in which a third special function of the control method according to the disclosure is reproduced.

FIGS. 3 to 5 illustrate special functions of the control method according to the disclosure with the aid of further graphs. They are optional depending on the operating and/or work function to be actuated. The following explanations therefore relate purely by way of example to the above-described driving function of the agricultural tractor.

First Special Function

According to a first special function illustrated in FIG. 3, when a singular full deflection of the manually actuated lever 14, detected after enabling the actuation of the driving function at a point in time t2>t1, is detected, the running of the transfer function 54 is modified by the control unit 38 such that the control command 50 is set directly to a value 58 corresponding to the full deflection, provided that the specified latency Δt_delay has already elapsed. The occurrence of the full deflection at the manually actuated lever 14 signals to the control unit 38 that the functional state saved by the user is to be called up.

In the present case, the manually actuated lever 14 is moved into the upper fully deflected position 44 along the primary activation slot 22, overcoming the tactile detent, such that the driving speed is set to the maximum speed specified by the user. If, in contrast, the manually actuated lever 14 is moved into the lower fully deflected position 46 along the primary activation slot 22, overcoming the tactile detent, the "active" standstill is set.

Second Special Function

Alternatively, if, as part of a second special function shown in FIG. 4, a singular full deflection of the manually actuated lever 14, detected before enabling the actuation of the driving function, is detected, the control command 50 is set directly to the value 58 corresponding to the full deflection by modifying the transfer function 54 after the specified latency Δt_delay has elapsed. This situation differs from that described above in that the user can indicate their clear intention, already before the point in time t1 at which the device for hand detection 36 responds, to call up the functional state, associated with the full deflection of the manually actuated lever 14 and saved by the user.

In contrast, should a plurality of singular full deflections occur at the manually actuated lever 14, one after the other, this is assumed to be an error on the part of the user and modification of the transfer function 54 is stopped.

Third Special Function

According to a third special function reproduced in FIG. 5, if a full deflection of the manually actuated lever 14, present at the point in time t1 when the actuation of the driving function is enabled, is detected, the control command 50 is set directly to a value 58 corresponding to the full deflection by modifying the transfer function 54 after the specified latency Δt_delay has elapsed. This represents a variation of the preceding case in that the user activates the manually actuated lever 14 already at the point in time t1 that the device for hand detection 36 responds with the clear intention of calling up the functional state associated with the full deflection of the manually actuated lever 14 and saved by the user.

The invention claimed is:

1. A method for a manually actuated lever provided for actuating an operating and/or work function, comprising:

generating via a sensor array a hand presence signal based on a palm resting on a handle part of the manually actuated lever indicating the existence of an activating intention on the part of a user;

enabling via a control unit actuation of the operating and/or work function based on the hand presence signal;

generating via the control unit an actuation command corresponding to a current deflection state when the manually actuated lever is deflected from a neutral or rest position along an activation slot; and aligning via the control unit a control command, provided to perform the operating and/or work function, according to a predefined transfer function, with the actuation command resulting from the current deflection state as soon as the actuation of the operating and/or work function is enabled.

2. The method of claim 1, wherein the control command is performed via the control unit when the enabling by the device for hand detection takes place within a predefined connection time after leaving the neutral or rest position.

3. The method of claim 1, wherein the performance of the control command starts with a delay in accordance with a predefined latency.

4. The method of claim 1, wherein when a singular full deflection of the manually actuated lever, detected after enabling the actuation of the operating and/or work function, is detected, the running of the transfer function is modified via the control unit by the control command being set directly to a value corresponding to the full deflection.

5. The method of claim 1, wherein when a singular full deflection of the manually actuated lever, detected before enabling the actuation of the operating and/or work function, is detected, the control command is, by modifying the transfer function, set directly to a value corresponding to the full deflection.

6. The method of claim 1, wherein when a full deflection of the manually actuated lever, present when the actuation of the operating and/or work function is enabled, is detected, the control command is, by modifying the transfer function, set directly to a value corresponding to the full deflection.

7. A system for a manually actuated lever provided for actuating an operating and/or work function, comprising:

a sensor array configured to generate a hand presence signal based on a palm resting on a handle part of the manually actuated lever indicating the existence of an activating intention on the part of a user; and a control unit configured to:

enable actuation of the operating and/or work function based on the hand presence signal;

generate an actuation command corresponding to a current deflection state when the manually actuated lever is deflected from a neutral or rest position along an activation slot; and align a control command, provided to perform the operating and/or work function, according to a predefined transfer function, with the actuation command resulting from the current deflection state as soon as the actuation of the operating and/or work function is enabled.

8. The system of claim 7, wherein the control command is performed via the control unit when the enabling by the device for hand detection takes place within a predefined connection time after leaving the neutral or rest position.

9. The system of claim 7, wherein the performance of the control command starts with a delay in accordance with a predefined latency.

10. The system of claim 7, wherein when a singular full deflection of the manually actuated lever, detected after enabling the actuation of the operating and/or work function, is detected, the running of the transfer function is modified by the control unit by the control command being set directly to a value corresponding to the full deflection.

11. The system of claim 7, wherein when a singular full deflection of the manually actuated lever, detected before enabling the actuation of the operating and/or work function, is detected, the control command is, by modifying the transfer function, set directly to a value corresponding to the full deflection.

12. The system of claim 7, wherein when a full deflection of the manually actuated lever, present when the actuation of the operating and/or work function is enabled, is detected, the control command is, by modifying the transfer function, set directly to a value corresponding to the full deflection.

* * * * *